US012739655B2

(12) United States Patent
Ye et al.

(10) Patent No.: US 12,739,655 B2
(45) Date of Patent: Sep. 15, 2026

(54) HANDOFF MATCHING IN A NETWORK MESH

(71) Applicant: Dell Products L.P., Round Rock, TX (US)

(72) Inventors: Qing Ye, Hopkinton, MA (US); Michael Healy, Scituate, MA (US)

(73) Assignee: Dell Products L.P., Round Rock, TX (US)

( * ) Notice: Subject to any disclaimer, the term of this patent is extended or adjusted under 35 U.S.C. 154(b) by 378 days.

(21) Appl. No.: 18/586,099

(22) Filed: Feb. 23, 2024

(65) Prior Publication Data

US 2025/0274775 A1 Aug. 28, 2025

(51) Int. Cl.
*H04W 16/18* (2009.01)
*H04W 28/20* (2009.01)

(52) U.S. Cl.
CPC ........... *H04W 16/18* (2013.01); *H04W 28/20* (2013.01)

(58) Field of Classification Search
CPC .............................. H04W 16/18; H04W 28/20
See application file for complete search history.

(56) References Cited

U.S. PATENT DOCUMENTS

2014/0133358 A1* 5/2014 Yin .................... H04L 41/0894 370/254
2019/0174358 A1* 6/2019 Gao ...................... H04W 72/29
2022/0029700 A1* 1/2022 Cui .................... H04B 7/18563
2023/0124420 A1* 4/2023 Kim .................. H04W 36/0007 370/331

OTHER PUBLICATIONS

"3rd Generation Partnership Project; Technical Specification Group Radio Access Network; Solutions for NR to support non-terrestrial networks (NTN) (Release 16)" 3GPP TR38.821, v16.2.0, Mar. 2023, 140 pages.
"3rd Generation Partnership Project; Technical Specification Group Radio Access Network; NR; Satellite Access Node radio transmission and reception (Release 17)" 3GPP TS38.108, v17.1.0, Sep. 2022, 57 pages.

(Continued)

*Primary Examiner* — Congvan Tran

(74) *Attorney, Agent, or Firm* — Amin, Turocy & Watson, LLP

(57) ABSTRACT

A system can receive respective information of a group of networks, wherein the respective information identifies a respective geographical area, a respective amount of bandwidth of the respective network, and whether the amount of bandwidth is to be requested or donated. The system can determine respective first coverage options for respective networks of the group of networks based on the respective information. The system can, after determining the respective first coverage options, receive a request from a network of the group of networks for bandwidth from another network of the group of networks. The system can, based on the request, determine second coverage options for the network based on the respective first coverage options and based on respective amounts of available bandwidth of the group of networks determined after receiving the request. The system can facilitate the network utilizing a second coverage option of the second coverage options.

20 Claims, 12 Drawing Sheets

(56) References Cited

OTHER PUBLICATIONS

"3rd Generation Partnership Project; Technical Specification Group Services and System Aspects; Study on supporting Unmanned Aerial Systems (UAS) connectivity, Identification and tracking (Release 17)", 3GPP TR 23.754, v17.1.0, Mar. 2021, 140 pages.

Desa, Hazry, et al. "Study of integration 2.4GHz and 5.8GHz in RFID tag", Proceedings of the International Conference on Man-Machine Systems (ICoMMS), Oct. 11-13, 2009, Batu Ferringhi, Penang, Malaysia, 4 pages.

"What is the Impact of the Atmosphere on RF Signal Propagation?" everythingRF. [https://www.everythingrf.com/community/what-is-the-impact-of-the-earths-atmosphere-on-rf-signal-propagation], retrieved Feb. 23, 2024, 3 pages.

* cited by examiner

200
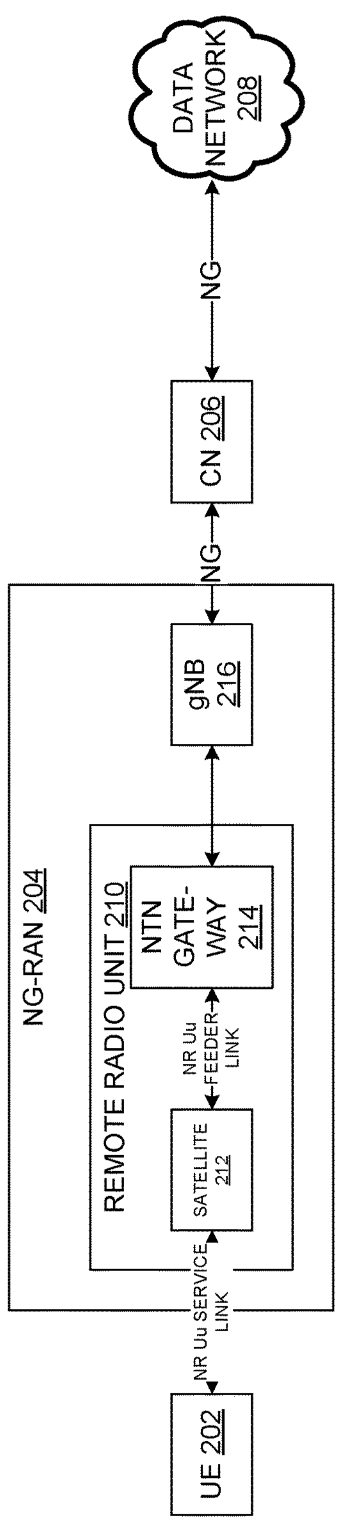
FIG. 2

300
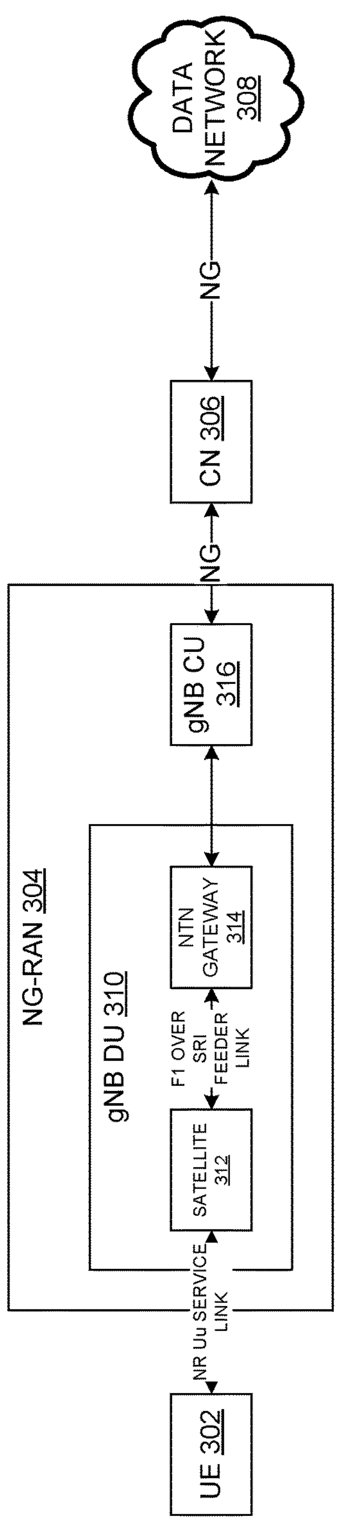
FIG. 3

HANDOFF MATCHING IN A 3D NETWORK MESH COMPONENT 406
404
| Satellite operating band | Uplink (UL) operating band SAN receive / UE transmit $F_{UL,low} - F_{UL,high}$ | Downlink (DL) operating band SAN receive / UE transmit $F_{DL,low} - F_{DL,high}$ | Duplex mode |
|---|---|---|---|
| N256 | 1980 MHz – 2010 MHz | 2170 MHz – 2200 MHz | FDD |
| N255 | 1626.5 MHz – 1660.5 MHz | 1525 MHz – 1559 MHz | FDD |
FIG. 4

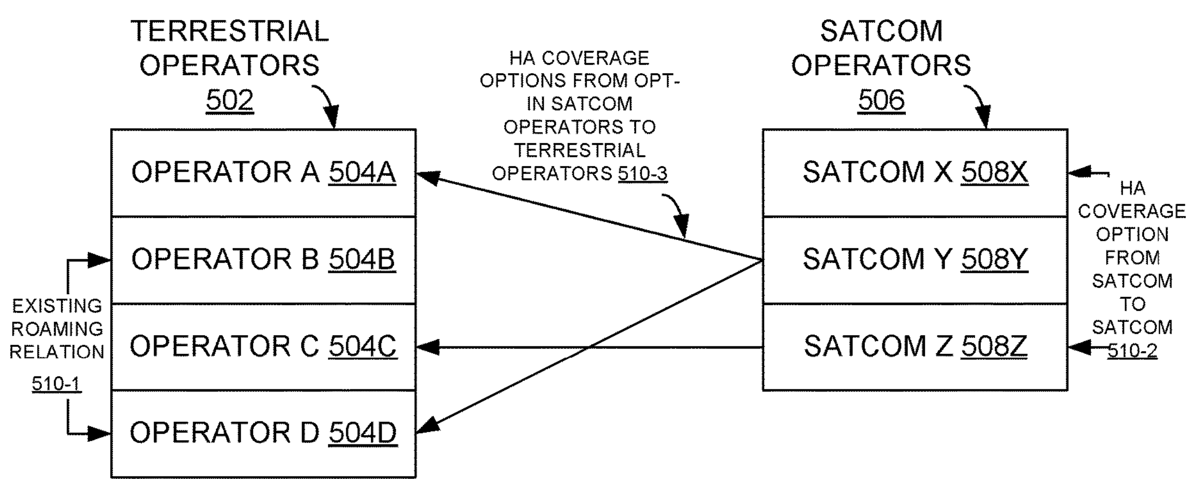
FIG. 5

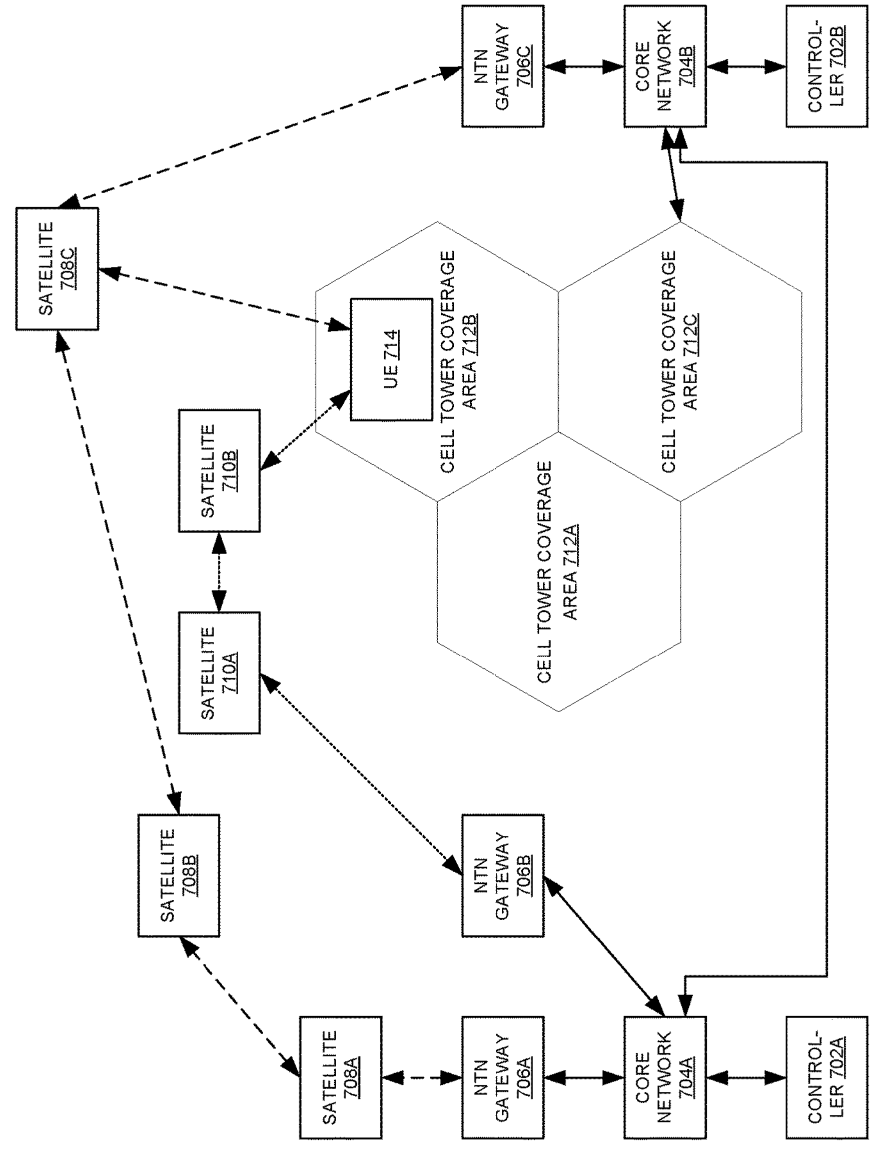
FIG. 7

900

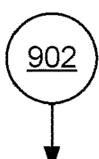

RECEIVING RESPECTIVE INFORMATION OF A GROUP OF NETWORKS, WHERE THE RESPECTIVE INFORMATION IDENTIFIES A RESPECTIVE GEOGRAPHICAL AREA OF NETWORK COVERAGE OF A RESPECTIVE NETWORK OF THE GROUP OF NETWORKS, A RESPECTIVE FIRST INDICATION OF AN AMOUNT OF BANDWIDTH OF THE RESPECTIVE NETWORK, AND A RESPECTIVE SECOND INDICATION OF WHETHER THE AMOUNT OF BANDWIDTH IS TO BE REQUESTED OR DONATED BY THE RESPECTIVE NETWORK, AND WHERE A SYSTEM THAT IMPLEMENTS PROCESS FLOW 900 IS SEPARATE FROM THE GROUP OF NETWORKS 904

DETERMINING RESPECTIVE FIRST COVERAGE OPTIONS FOR RESPECTIVE NETWORKS OF THE GROUP OF NETWORKS BASED ON THE RESPECTIVE INFORMATION 906

AFTER DETERMINING THE RESPECTIVE FIRST COVERAGE OPTIONS, RECEIVING A REQUEST FROM A NETWORK OF THE GROUP OF NETWORKS FOR BANDWIDTH FROM ANOTHER NETWORK OF THE GROUP OF NETWORKS 908

BASED ON THE REQUEST, DETERMINING SECOND COVERAGE OPTIONS FOR THE NETWORK BASED ON THE RESPECTIVE FIRST COVERAGE OPTIONS AND BASED ON RESPECTIVE AMOUNTS OF AVAILABLE BANDWIDTH OF THE GROUP OF NETWORKS DETERMINED AFTER RECEIVING THE REQUEST 910

FACILITATING THE NETWORK UTILIZING A SECOND COVERAGE OPTION OF THE SECOND COVERAGE OPTIONS FOR NETWORK COMMUNICATIONS 912

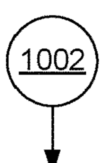

RECEIVING RESPECTIVE INFORMATION OF A GROUP OF NETWORKS, WHERE THE RESPECTIVE INFORMATION IDENTIFIES A RESPECTIVE GEOGRAPHICAL AREA OF NETWORK COVERAGE OF A RESPECTIVE NETWORK OF THE GROUP OF NETWORKS, A RESPECTIVE FIRST INDICATION OF AN AMOUNT OF BANDWIDTH OF THE RESPECTIVE NETWORK, AND A RESPECTIVE SECOND INDICATION OF WHETHER THE AMOUNT OF BANDWIDTH IS TO BE REQUESTED OR DONATED BY THE RESPECTIVE NETWORK, AND WHERE A SYSTEM THAT IMPLEMENTS PROCESS FLOW 1000 IS SEPARATE FROM THE GROUP OF NETWORKS 1004

DETERMINING RESPECTIVE FIRST COVERAGE OPTIONS FOR RESPECTIVE NETWORKS OF THE GROUP OF NETWORKS BASED ON THE RESPECTIVE INFORMATION 1006

AFTER DETERMINING THE RESPECTIVE FIRST COVERAGE OPTIONS, RECEIVING A REQUEST FROM A FIRST NETWORK OF THE GROUP OF NETWORKS FOR BANDWIDTH FROM A SECOND NETWORK OF THE GROUP OF NETWORKS 1008

BASED ON THE REQUEST, DETERMINING SECOND COVERAGE OPTIONS FOR THE FIRST NETWORK BASED ON THE RESPECTIVE FIRST COVERAGE OPTIONS AND BASED ON RESPECTIVE AMOUNTS OF AVAILABLE BANDWIDTH OF THE GROUP OF NETWORKS DETERMINED AFTER RECEIVING THE REQUEST 1010

FACILITATING THE FIRST NETWORK TO UTILIZE A SECOND COVERAGE OPTION OF THE SECOND COVERAGE OPTIONS FOR NETWORK COMMUNICATIONS 1012

FIG. 10

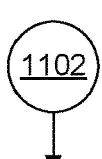

1100

1102

RECEIVING RESPECTIVE INFORMATION OF A GROUP OF NETWORKS, WHERE THE RESPECTIVE INFORMATION IDENTIFIES WHETHER BANDWIDTH IS TO BE REQUESTED OR DONATED BY THE RESPECTIVE NETWORK, AND WHERE A SYSTEM THAT IMPLEMENTS PROCESS FLOW 1100 IS SEPARATE FROM THE GROUP OF NETWORKS 1104

DETERMINING RESPECTIVE FIRST COVERAGE OPTIONS FOR RESPECTIVE NETWORKS OF THE GROUP OF NETWORKS BASED ON THE RESPECTIVE INFORMATION 1106

AFTER DETERMINING THE RESPECTIVE FIRST COVERAGE OPTIONS, RECEIVING A REQUEST FROM A FIRST NETWORK OF THE GROUP OF NETWORKS FOR BANDWIDTH FROM SECOND NETWORK OF THE GROUP OF NETWORKS 1108

BASED ON THE REQUEST, DETERMINING SECOND COVERAGE OPTIONS FOR THE FIRST NETWORK BASED ON THE RESPECTIVE FIRST COVERAGE OPTIONS AND BASED ON RESPECTIVE AMOUNTS OF AVAILABLE BANDWIDTH OF THE GROUP OF NETWORKS DETERMINED AFTER RECEIVING THE REQUEST 1110

ENABLING THE FIRST NETWORK TO UTILIZE A SECOND COVERAGE OPTION OF THE SECOND COVERAGE OPTIONS FOR NETWORK COMMUNICATIONS 1112

HANDOFF MATCHING IN A NETWORK MESH

BACKGROUND

Multiple telecommunications providers can interoperate to facilitate a highly-redundant space and ground converged three-dimensional (3D) network.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can receive respective information of a group of networks, wherein the respective information identifies a respective geographical area of network coverage of a respective network of the group of networks, a respective first indication of an amount of bandwidth of the respective network, and a respective second indication of whether the amount of bandwidth is to be requested or donated by the respective network, and wherein the system is separate from the group of networks. The system can determine respective first coverage options for respective networks of the group of networks based on the respective information. The system can, after determining the respective first coverage options, receive a request from a network of the group of networks for bandwidth from another network of the group of networks. The system can, based on the request, determine second coverage options for the network based on the respective first coverage options and based on respective amounts of available bandwidth of the group of networks determined after receiving the request. The system can facilitate the network utilizing a second coverage option of the second coverage options for network communications.

An example method can comprise receiving, by a system comprising at least one processor, respective information of a group of networks, wherein the respective information identifies a respective geographical area of network coverage of a respective network of the group of networks, a respective first indication of an amount of bandwidth of the respective network, and a respective second indication of whether the amount of bandwidth is to be requested or donated by the respective network, and wherein the system is separate from the group of networks. The method can further comprise determining, by the system, respective first coverage options for respective networks of the group of networks based on the respective information. The method can further comprise, after determining the respective first coverage options, receiving, by the system, a request from a first network of the group of networks for bandwidth from a second network of the group of networks. The method can further comprise, based on the request, determining, by the system, second coverage options for the first network based on the respective first coverage options and based on respective amounts of available bandwidth of the group of networks determined after receiving the request. The method can further comprise facilitating, by the system, the first network to utilize a second coverage option of the second coverage options for network communications.

An example non-transitory computer-readable medium can comprise instructions that, in response to execution, cause a system comprising a processor to perform operations. These operations can comprise receiving respective information of a group of networks, wherein the respective information identifies whether bandwidth is to be requested or donated by the respective network, and wherein the system is separate from the group of networks. These operations can further comprise determining respective first coverage options for respective networks of the group of networks based on the respective information. These operations can further comprise, after determining the respective first coverage options, receiving a request from a first network of the group of networks for bandwidth from second network of the group of networks. These operations can further comprise, based on the request, determining second coverage options for the first network based on the respective first coverage options and based on respective amounts of available bandwidth of the group of networks determined after receiving the request. These operations can further comprise enabling the first network to utilize a second coverage option of the second coverage options for network communications.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 2 illustrates an example transparent next generation radio access network (NG-RAN) system architecture, and that can facilitate handoff matching in a 3D network mesh, in accordance with an embodiment of this disclosure;

FIG. 3 illustrates an example regenerative NG-RAN system architecture, and that can facilitate handoff matching in a 3D network mesh, in accordance with an embodiment of this disclosure;

FIG. 4 illustrates an example table of satellite operating bands, and that can facilitate handoff matching in a 3D network mesh, in accordance with an embodiment of this disclosure;

FIG. 5 illustrates an example system architecture of opt-in operators and coverage options, and that can facilitate handoff matching in a 3D network mesh, in accordance with an embodiment of this disclosure;

FIG. 7 illustrates an example system architecture of multiple coverage options for a terrestrial operator, and that can facilitate handoff matching in a 3D network mesh, in accordance with an embodiment of this disclosure;

FIG. 9 illustrates an example process flow that can facilitate handoff matching in a 3D network mesh, in accordance with an embodiment of this disclosure;

FIG. 10 illustrates another example process flow that can facilitate handoff matching in a 3D network mesh, in accordance with an embodiment of this disclosure;

FIG. 11 illustrates another example process flow that can facilitate handoff matching in a 3D network mesh, in accordance with an embodiment of this disclosure;

DETAILED DESCRIPTION

Overview

Figure 1:
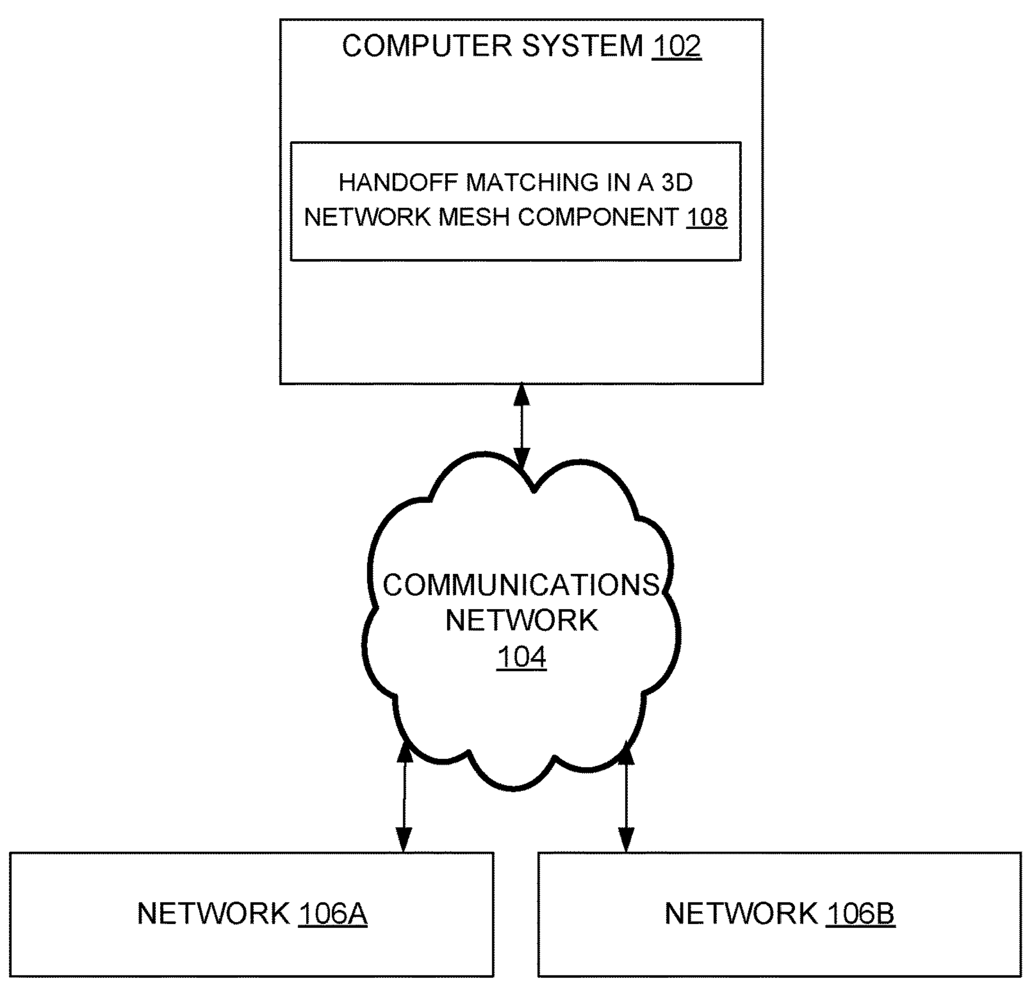
FIG. 1 illustrates an example system architecture that can facilitate handoff matching in a 3D network mesh, in accordance with an embodiment of this disclosure.

It can be that satellite communications (satcom) have been commercialized to provide mobile (e.g., aviation, sea, railroad), fixed (e.g., an isolated rural area), and broadcast services, while terrestrial broadband cellular communications networks went through second generation (2G), third generation (3G), fourth generation (4G), and fifth generation (5G) evolutions. However, it can be that most satellite services can rely on geostationary orbits (GEOs) that provide radiofrequency (RF) relays over long distances, resulting in a roundtrip latency of around 500 milliseconds (ms). It can be that a large deployment of low Earth orbit (LEO) satellites has dramatically reduced that latency down to a 50 ms range, which can facilitate direct-to-device (D2D) technology, such as user equipments (UEs) communicating directly with satellites overhead. However, it can be that a high availability (HA) of networks is hard to obtain. In addition to occasional hardware/software (HW/SW) malfunctions, it can be that the signal can easily be disrupted by severe weather conditions, especially for higher frequency signals. This can result in a significant impact to users, because it can be that for most of them, satcom is the only way to connect with the rest of the world for critical communications. Similarly, when cell towers on the ground have an HW/SW malfunction or become completely unavailable (e.g., war or earthquake), it can be that a backup solution is vital to keep critical communications going, and sometimes those communications can be lifesaving.

Today it can be that satcom and 4G/5G operators only have knowledge of their own network. That is, it can be that no matter how robust their networks are built, the timing and location of connectivity disruption can be unpredictable. It can be cost-prohibitive for each operator to construct their own HA infrastructure for cells they are servicing. In contrast, it can be that pooling and sharing resource across a three-dimensional (3D) network mesh can be a most economical approach. This scenario can create a market for a neutral trustable orchestrator to analyze the real-time conditions and operation parameters of multiple operators in a pool to suggest optimal HA coverages. It can be that none of the operators can take this neutral role due to a potential conflict of interest.

To address these problems, the present techniques can be implemented to facilitate handoff matching across integrated terrestrial and non-terrestrial networks to support a high availability of user experience anywhere and anytime. The handoff matching can be determined and managed by a controller that resides on server and storage platform that is controlled by an entity other than a network operator.

It can be that satcom services have grown exponentially. It can be that that number is expected to grow 10 times by 2030. The Third-Generation Partnership Project (3GPP) standards body has published normative specifications on 5G New Radio (NR) Non-Terrestrial Network (NTN) (NR-NTN) technology to integrate new radio with a non-terrestrial network. However, it can be that there is no prior approach to host multiple operators and to cover multiple service disruption scenarios to address HA needs. The present techniques can be implemented to provide a neutral transparent handoff matching service for operators to benefit from a shared resource pool.

In some examples, a handoff matching determination can comprise two steps. In a first step, and for opt-in operators, multiple HA handoff options can be predetermined for multiple disruption scenarios and are shared as baseline options to both requestors and donors. In a second step, when a disruption occurs, dynamic network parameters can be re-matched in real-time to identify modifications and/or deviations from the predetermined baseline options. Both a requestor and a donor can have a flexibility to pick an option that meets their needs, such as based on matching details and pricing info.

Implementing the present techniques can provide advantages relative to prior approaches. A two-step matching determination can provide benefits to operators and can facilitate smooth handoffs between 4G/5G operators and satcom operators.

Another advantage can relate to speed. In some examples, in addition to match coverage, frequency, bandwidth, QoS, etc., a system that implements the present techniques can determinate a link budget, a typical path loss, potential neighbor cell interference, etc., in the requested HA cells for multiple disruption scenarios. It can be that these baselines do not vary significantly, as operating frequency for each cell can be pre-defined by operators. When disruption happens, the dynamic matching options can be identified faster than starting from scratch.

Another advantage can relate to transparency. It can be that pre-matched baseline options are shared with opt-in requestors and donors, so they are aware of typical HA coverage options and can pre-plan handoff protocols accordingly to better prepare for service disruption.

Another advantage can relate to alerts. In some examples, risk zones can be marked on predetermined curves to alert types of weather conditions that can attenuate RF signal too much to tolerate fluctuations. This predetermined risk zone can facilitate satcom operators in temporarily increasing RF transmitter power to avoid a potential outage, as the satellite may not operate in maximum power mode all the time.

The present techniques can offer advantages in scenarios where communication is impacted in a large area where multiple operators get disrupted. A partition of limited recovery bandwidth can be suggested, for example, per population density or per tiered user equipment (UE) category to prioritize first responder or government rescue activity, instead of first come first serve or higher price rules. These emergency policies can be transparent in an opt-in agreement. It can be that only a neutral orchestrator (e.g., not a network operator) can be trusted to execute this type of services.

In prior approaches, it can be that satcom and 4G/5G operators only have knowledge of their own network. There can be examples where terrestrial operators seek to partner with non-terrestrial operators to expand their market to places with no cell coverage. Such a partnership is not related to HA coverage. That is, prior approaches can lack technology to integrate operations of multiple operators to cover multiple service disruption scenarios for HA needs. To achieve connectivity anywhere anytime, a neutral trustable orchestration platform can be implemented, so as to under-stand an opt-in standalone network's sharable capability and to help match the handoff across a 3D network to achieve ubiquitous connectivity.

Example Architectures, Etc

FIG. 1 illustrates an example system architecture 100 that can facilitate handoff matching in a 3D network mesh, in accordance with an embodiment of this disclosure.

System architecture 100 comprises computer system 102, communications network 104, and network 106A and network 106B. In turn, computer system 102 comprises handoff matching in a 3D network mesh component 108.

System architecture 100 presents one logical example of implementing the present techniques, and it can be appreciated that there can be other example architectures.

Figure 12:
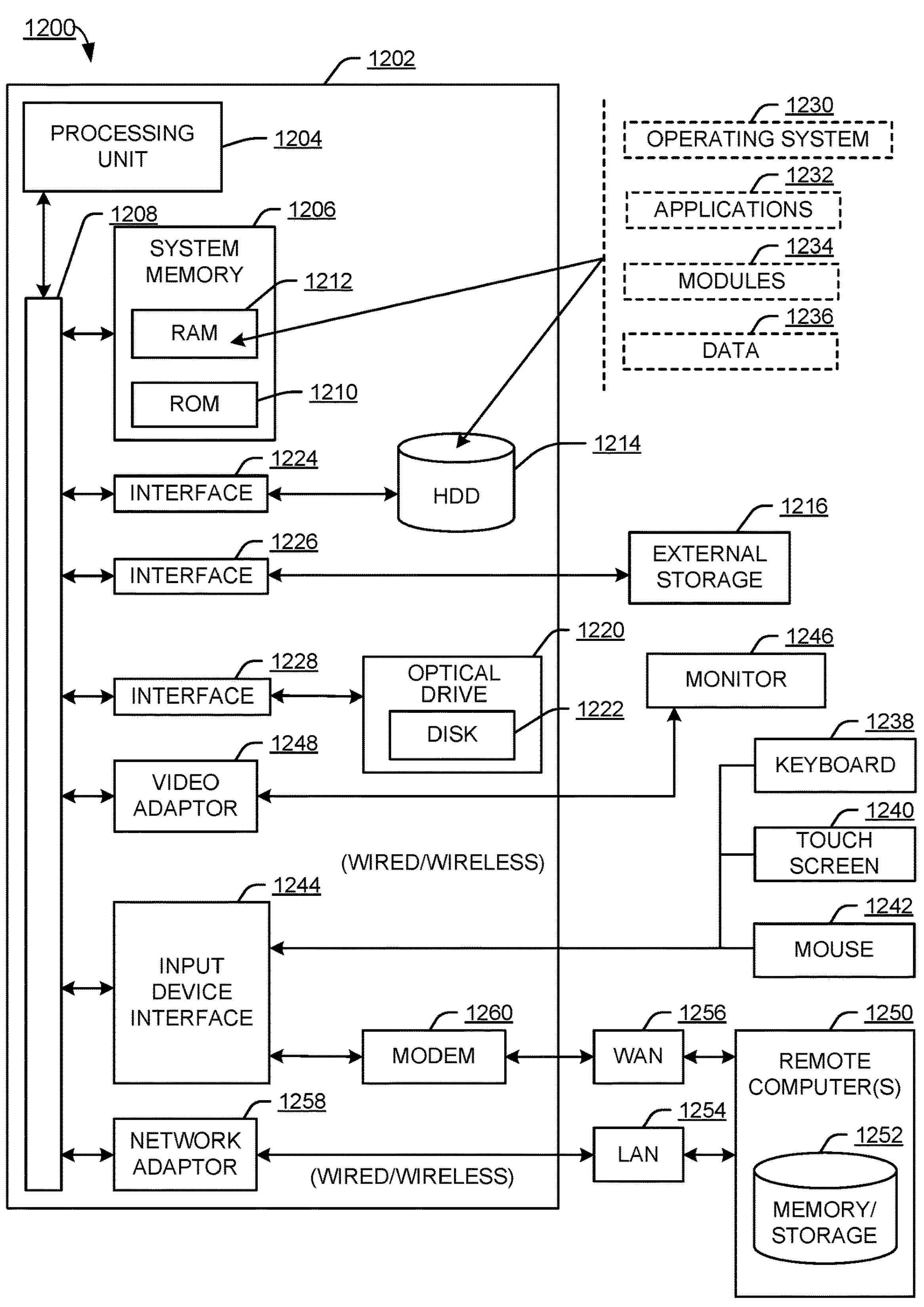
FIG. 12 illustrates an example block diagram of a computer operable to execute an embodiment of this disclosure.

Each of computer system 102, network 106A, and/or network 106B can be implemented with part(s) of computing environment 1200 of FIG. 12. Communications network 104 can comprise a computer communications network, such as the Internet, or an intranet.

In some examples, handoff matching in a 3D network mesh component 108 can facilitate HA functionality for users of network 106A to failover to using network 106B (or vice versa).

Figure 6:
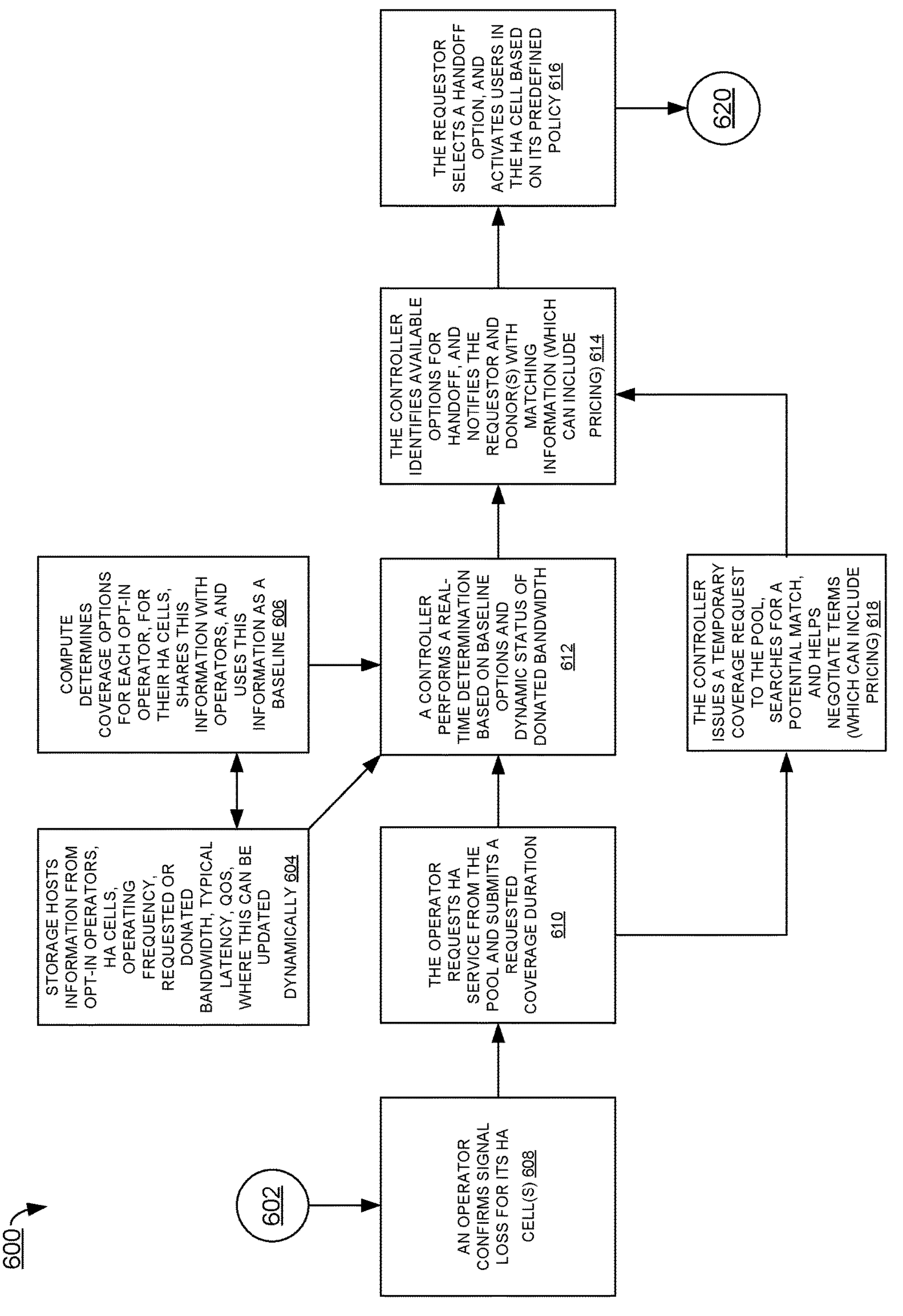
FIG. 6 illustrates an example process flow that can facilitate handoff matching in a 3D network mesh, in accordance with an embodiment of this disclosure.

In some examples, handoff matching in a 3D network mesh component 108 can implement part(s) of the process flows of FIGS. 6 and/or 9-11 to implement handoff matching in a 3D network mesh.

It can be appreciated that system architecture 100 is one example system architecture for handoff matching in a 3D network mesh, and that there can be other system architectures that facilitate handoff matching in a 3D network mesh.

FIG. 2 illustrates an example transparent NG-RAN system architecture 200, and that can facilitate handoff matching in a 3D network mesh, in accordance with an embodiment of this disclosure. In some examples, part(s) of FIG. 2 can be used to implement part(s) of system architecture 100 of FIG. 1 to deploy handoff matching in a 3D network mesh.

3GPP can define standards to support interoperability between satcom operators and 4G/5G operators. NR-NTN normative specifications can describe two architectures: transparent mode and regenerative mode.

In a transparent architecture, a satellite payload can implement radio unit (RU) functions such as frequency conversion and RF amplification, acting as a radio relay. Both a service link and a feeder link can use an NR air (Uu) interface. This can allow different satcoms to connect the same gNodeB (gNB) on the ground.

System architecture 200 comprises UE 202, NG-RAN 204, core network (CN) 206, data network 208, remote radio unit 210, satellite 212, non-terrestrial network (NTN) gateway 214, gNB 216, and handoff matching in a 3D network mesh component 218.

It can be that, in a transparent NG-RAN architecture, a satellite acts as an RF relay, and only includes a radio unit (RU).

FIG. 3 illustrates an example regenerative NG-RAN system architecture 300, and that can facilitate handoff matching in a 3D network mesh, in accordance with an embodiment of this disclosure. In some examples, part(s) of FIG. 3 can be used to implement part(s) of system architecture 100 of FIG. 1 handoff matching in a 3D network mesh.

System architecture 300 comprises UE 302, NG-RAN 304, CN 306, data network 308, gNB distributed unit (DU) 310, satellite 312, NTN gateway 314, gNB central unit (CU) 316, and handoff matching in a 3D network mesh component 318.

In a regenerative architecture, a satellite payload can implement part of or a full gNB to offer additional radio resource management functions (relative to a transparent architecture) such as modulation/demodulation, encoding/decoding, switch and/or routing. The service link can still use an NR Uu interface while the feeder link can use a 3GPP F1 interface over the satcom's non-standard satellite radio interface (SRI). This can allow different gNBs on a satellite to connect to the same 5G core network on the ground.

In a regenerative NG-RAN architecture, a satellite can host part of or a full gNB (where an RU and a DU are located on a satellite, CU could be located on a satellite or stay with a ground gateway).

FIG. 4 illustrates an example table 400 of satellite operating bands, and that can facilitate handoff matching in a 3D network mesh, in accordance with an embodiment of this disclosure. In some examples, part(s) of FIG. 4 can be used to implement part(s) of system architecture 100 of FIG. 1 handoff matching in a 3D network mesh.

Table 400 comprises rows 402, columns 404, and handoff matching in a 3D network mesh component 406.

An NR-NTN normative specification can also define satellite operating bands to communicate with a UE directly.

These frequency ranges can facilitate direct communications between a satellite and a UE as long as transmitters/receivers and antenna gains support the link budget. That can be why a handoff matching service can be utilized to predetermine possible routes and verify parameters, as well as re-determine in real time to provide viable options when disruption events happen.

The present techniques can be implemented to improve upon problems with prior approaches. A neutral shared service pool can be implemented, which can offer services based on analysis of opt-in operators' operational info. In some examples, opt-in operators can include both terrestrial (4G/5G operators) and non-terrestrial (satcom operators), who comply to 3GPP protocols and interfaces. A cloud and edge service in storage and compute can be utilized to host an analytic platform that facilitates the present techniques. HA can be one of the service offerings, where a controller delivers communication handoff matching for one or more geographic areas where operators desire HA coverage. To join the pool, and in some examples, an operator can request coverage in one geographic area when needed (that is, act as a requestor and a payor who pays for the HA service), or donate surplus capacity in one or more geographic areas based on their historic records of network traffic metering (act as a donor who monetizes its idle bandwidth at certain timeslots through matching according to the present techniques), or an operator can do both in the same or different geographic areas (e.g., act as requestor in one area and act as donor in another).

In some examples, a controller that implements the present techniques can comprise a compute component and a storage component. A storage component can host each operator's opt-in RF coverage maps, and their associated communication frequencies for each HA cell and its neighboring cells; the donated bandwidth per cell at a pre-defined price range and timeslots based on their network traffic histogram; and the general service level agreement (SLA) such as how many channels can be supported simultaneously for each cell, uplink and downlink speed range, one way latency, etc. This kind of information sharing can be implemented for both terrestrial and non-terrestrial operators. This information can be continuously updated to reflect the dynamic status from each opt-in operator for their HA cells.

A compute component can map out relevant inter-network coverage overlaps to determine a list of available options for each HA cell. The handoff matching determination can take into consideration neighboring frequencies to avoid handoff creating interference; the original transmitter/receiver's RF power and antenna gain to model a link budget to ensure satcom service compatibility; additional path loss if there is a severe weather condition; the donor's sharable bandwidth and timeslots based on the donor's network traffic histogram; the requestor's existing roaming partner; an acceptable price range at multiple service levels; and a cause of the reported service disruption, etc.

The controller can connect to a core network, and can be located in a cloud or an edge. An edge controller can host a local 4G/5G operator's information, and local weather information. Satcom orbit information can be public, but the exact frequency band may be different from country to country (e.g., because it needs approval from local government). So, satcom information related to a local region can also be hosted at an edge controller to put both data and compute closer to local opt-in players to reduce latency. One or more controllers can be used to service one or more geographic areas, and this can depend on computation performance, cost, energy consumption, and data regulation.

The controller can prioritize HA options based on factors such as a quality of service match, a frequency match, a range of latency match, a projected cost per day for requested HA coverage, etc. A criterion of prioritization can be to minimize a fluctuation on subscribers' side, so the opt-in operators can achieve a higher customer satisfaction than their competitor by leveraging shared resources. With this matching service, donors can turn their idle capacity into revenue, while requestors can also monetize providing an HA service to their subscribers, who may be willing to pay a premium on their monthly subscription plan to keep connected all the time. An HA matching services can function as a form of insurance for both operators and their subscribers.

With information sharing on requested or donated resources (e.g., coverage map, frequency, bandwidth, SLA, timeslot, latency), and a pre-defined policy including pricing range and limited bandwidth partition criteria accepted by opt-in operators, multiple service disruption scenarios with ranked HA coverage options for requested HA cells can be determined and stored. Where the present techniques are generally implemented in two steps, this can comprise step one, static analysis. These options can serve as a baseline for a controller to speed up a real-time handoff matching determination when a disruption occurs. Because the disruption events can be unexpected, a real-time calculation with available bandwidth from donors at that moment can be performed (e.g., a donor operator's own network traffic can increase significantly during a regional war. As a result, the donor may inform the controller to reduce its sharable bandwidth). In a two-step implementation, that can comprise step two, dynamic analysis.

These baseline options can be available to opt-in operators for transparency so they are aware of typical HA route options and can pre-plan handoff protocols accordingly to better prepare for service disruption. This transparency can provide extra value and insights to opt-in operators for advanced planning, and as a result, it can help earn operators' trust in the present techniques.

For example, when operator A's HW/SW malfunctions, it can be that it only affects one or a few cells. If operator B is part of operator A's baseline options, and has available capacity for these affected cells at that time, the disrupted communication can be temporarily covered by operator B. This can be done through a handoff matching service or through their existing roaming partnership. However, upon unfortunate events like an earthquake or war, it can wipe out a group of cell towers and impact multiple operators in the region including operator A, operator B, and others. Therefore, it can be that a bare minimum connectivity can be critical for multiple operators at the same time to save lives. This can be where a partition policy per the present techniques can be implemented in per pre-agreed criteria, such as government rescue activity taking priority, or per population density of the cell. Because a timing and a location of these disruption events can be unpredictable, it can be challenging for operators to predict service disruptions, and form a partnership ahead of time. This can be why a neutral handoff matching platform can be implemented to monitor a dynamic status of a shared pool. From the baseline options, the controller can evaluate in real-time what resources available at that time, what modification (e.g., frequency shift) or compromise (e.g., reduced bandwidth) that each impacted operator can make from a pre-communicated baseline in order to leverage available pool capacity (such as by satcom operators). Without neutral orchestration, it can be that each operator would have to submit ad hoc requests widely and blindly and might not receive a timely response.

FIG. 5 illustrates an example system architecture 500 of opt-in operators and coverage options, and that can facilitate handoff matching in a 3D network mesh, in accordance with an embodiment of this disclosure. In some examples, part(s) of FIG. 5 can be used to implement part(s) of system architecture 100 of FIG. 1 handoff matching in a 3D network mesh.

System architecture 500 comprises terrestrial operators 502, operator A 504A, operator B 504B, operator C 504C, operator D 504D, satcom operators 506, satcom X 508X, satcom Y 508Y, satcom Z 508Z, existing roaming relation 510-1, HA coverage option from satcom to satcom 510-2, and HA coverage options from opt-in satcom operators to terrestrial operators 510-3 (where different lines can represent different frequencies).

There are 4G/5G operators, such as operator A 504A, operator B 504B, operator C 504C, and operator 504D—where operator B 504B and operator D 504D have existing roaming relation 510-1. The existing roaming partner can be considered during the matching determination based on requested and available bandwidth at the moment of the requestor's service disruption.

Satcom operators such as satcom X 508X, satcom Y 508Y, and satcom Z 508Z can operate at their own orbits and constellations with different service link frequencies. Since electromagnetic wave attenuates when propagating through the atmosphere and the signal loss increases as the frequency increases, a satcom that operates at a lower frequency can have an advantage of tolerating bad weather (e.g., rain, fog, air turbulence) over those operating at a higher frequency. For example, a tropical downpour can cause ~5 decibels/kilometer (dB/km) attenuation for RF higher than 10 gigahertz (GHz), while the impact can be negligible (<0.05 dB/km) for RF lower than 1 GHz.

Homogenous HA options, such as coverage from one 4G/5G operator to another 4G/5G operator, or from one satcom operator to another satcom operator, are noted as 510-1 and 510-2.

Heterogenous HA options, such as coverage from a satcom operator to a 4G/5G operator, noted as 510-3, where different arrows represent different satcom service link frequencies.

FIG. 6 illustrates an example process flow 600 that can facilitate handoff matching in a 3D network mesh, in accordance with an embodiment of this disclosure. In some examples, one or more embodiments of process flow 600 can be implemented by handoff matching in a 3D network mesh component 108 of FIG. 1, or computing environment 1200 of FIG. 12.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 900 of FIG. 9, process flow 1000 of FIG. 10, and/or process flow 1100 of FIG. 11.

Process flow starts at 602, and ends at 620.

Operation 604 depicts storage hosts information from opt-in operators, HA cells, operating frequency, requested or donated bandwidth, typical latency, QoS, where this can be updated dynamically.

Operation 606 depicts compute determines coverage options for each opt-in operator, for their HA cells, shares this information with operators, and uses this information as a baseline.

Operation 608 depicts an operator confirming signal loss for its HA cell(s).

Operation 610 depicts the operator requesting HA service from the pool and submits a requested coverage duration.

Operation 612 depicts a controller performing a real-time determination based on baseline options and dynamic status of donated bandwidth.

Operation 614 depicts the controller identifies available options for handoff, and notifies the requestor and donor(s) with matching information (which can include pricing).

Operation 616 depicts the requestor selecting a handoff option, and activates users in the HA cell based on its predefined policy.

Operation 618 depicts the controller issues a temporary coverage request to the pool, searches for a potential match, and helps negotiate terms (which can include pricing).

FIG. 6 is an example of a process flow that can be implemented on a controller that can handle requests, and provide matching options in a shared HA pool to opt-in operators or ad hoc players.

To start the pool, the controller can create a database hosting information such as a coverage map, operating frequencies, protocols, bandwidth, a latency range, QoS, service level (e.g., some cells can opt-out of HA service), etc. from each opt-in requestor and donor. The information can be shared periodically to reflect a dynamic network status. An operator can act as both a donor and a requestor for certain cells while only having one role for other cells, depending on their needs.

The controller can determine and rank baseline options for identified HA cells, share with a donor and a requestor, propose HA a service agreement with price ranges (e.g., varying based on geographic location, disruption event scenarios, etc.) that are acceptable to both requestors and donors.

When a disruption event happens, an operator can confirm signal loss, and submit an HA request to a controller. If the operator is an opt-in player, the controller will evaluate real time channel capacity available from donors and perform handoff matching calculation using prevailing network parameters. If a dynamic status supports baseline options, the pre-planned handoff protocol can be quickly executed between the requestor and the donor following standards. If dynamic parameters deviate from baselines, the controller can advise a modification (e.g., frequency shift) or compromise (e.g., reduced bandwidth) from a pre-communicated baseline option to both requestors and donors with detailed parameter match to bridge handoff.

It can be that these options are not necessarily a one-to-one relation. When a satcom service donor receives more than one matched request through the controller (e.g., a war or earthquake event discussed above), the controller determination can suggest a partition of very limited recovery bandwidth per population density or per tiered UE category to prioritize emergency responders and government rescue activity, instead of first come first serve or higher price rules. With this handoff matching, a donor can share their capacity to more than one requestor, so each requestor ends up with connectivity but at reduced bandwidth to support text or voice only.

When an ad-hoc requestor solicitates backup from the pool, the controller can perform a real-time determination, evaluating if it is a standard protocol, what available cell coverage is at a requestor's frequency, bandwidth, link budget, etc., from existing capacity to suggest handoff matching option to both the requestor and potential donors. If the matching option is not ideal, the controller can issue a temporary coverage request to the pool listing the cell locations, targeting frequency range, etc., to see if any donor would provide ad hoc coverage at a higher price. But it can be that, without a pre-defined policy and opt-in agreement, the negotiation to bridge the ad hoc requestor and donor can take longer (e.g., there may not be a quick response from the donor). Even if the requestor gets an OK option, their cost for HA could be much more expensive than opt-in players. This again shows a value of a handoff matching service per the present techniques.

FIG. 7 illustrates an example system architecture 700 of multiple coverage options for a terrestrial operator, and that can facilitate handoff matching in a 3D network mesh, in accordance with an embodiment of this disclosure. In some examples, part(s) of FIG. 7 can be used to implement part(s) of system architecture 100 of FIG. 1 handoff matching in a 3D network mesh.

System architecture 700 comprises controller 702A (which can implement part(s) of the present techniques), controller 702B, core network 704A, core network 704B, NTN gateway 706A, NTN gateway 706B, NTN gateway 706C, satellite 708A, satellite 708B, satellite 708C, satellite 710A, satellite 710B (where satellite 708A, satellite 708B, and satellite 708C can be of one communications type or constellation, and satellite 710A and satellite 710B can be of another communications type or constellation), cell tower coverage area 712A, cell tower coverage area 712B, cell tower coverage area 712C, and UE 714.

The following scenario relates to HA services for cellular communications leveraging a 3D network. The requestor can be 4G/5G operators. The donor can be satcom operators. The customer base can comprise enterprises and individuals solely relying on 4G/5G cellular and continuous connectivity is critical for their daily operations, and/or users in areas with high probability of natural disaster.

For example, in FIG. 7, when an opt-in 4G/5G operator's cellular service is unavailable in an HA cell (affecting cell tower coverage area 712B), its subscribers (e.g., UE 714)

can be impacted and lose connection with their base station. An operator can report signal loss and request HA coverage from the shared pool. A controller can perform a real-time handoff matching determination, and examine the deviation from pre-determined baseline options based on the dynamic network status. The matching can offer roaming options with a neighbor cell (which can have limited bandwidth due to regional events), a satcom option (lower frequency band, via satellite 710A and satellite 710B), or a satcom option (higher frequency band, via satellite 708A, satellite 708B, and satellite 708C), with detailed matching parameters and price info.

After evaluating pros and cons, in this example, the satcom option on a lower frequency band is chosen by the requestor. The controller can issue a digital contract with both donor and requestor reflecting the pre-defined policy, opt-in agreement, and agreed service start and end time. Then the donor satcom on the lower frequency band can beam down the matched RF signal through an NR Uu interface to the HA cell to establish UE channels and carry the HA cell's traffic to a ground station as backhaul for an internet connection (transport layer). A requestor operator backhaul can connect data service for their subscribers who signed up for HA services ahead-of time (service layer), and non-subscriber can still have an emergency (SOS) channel per an enhanced 911 (E911) standard.

Figure 8:
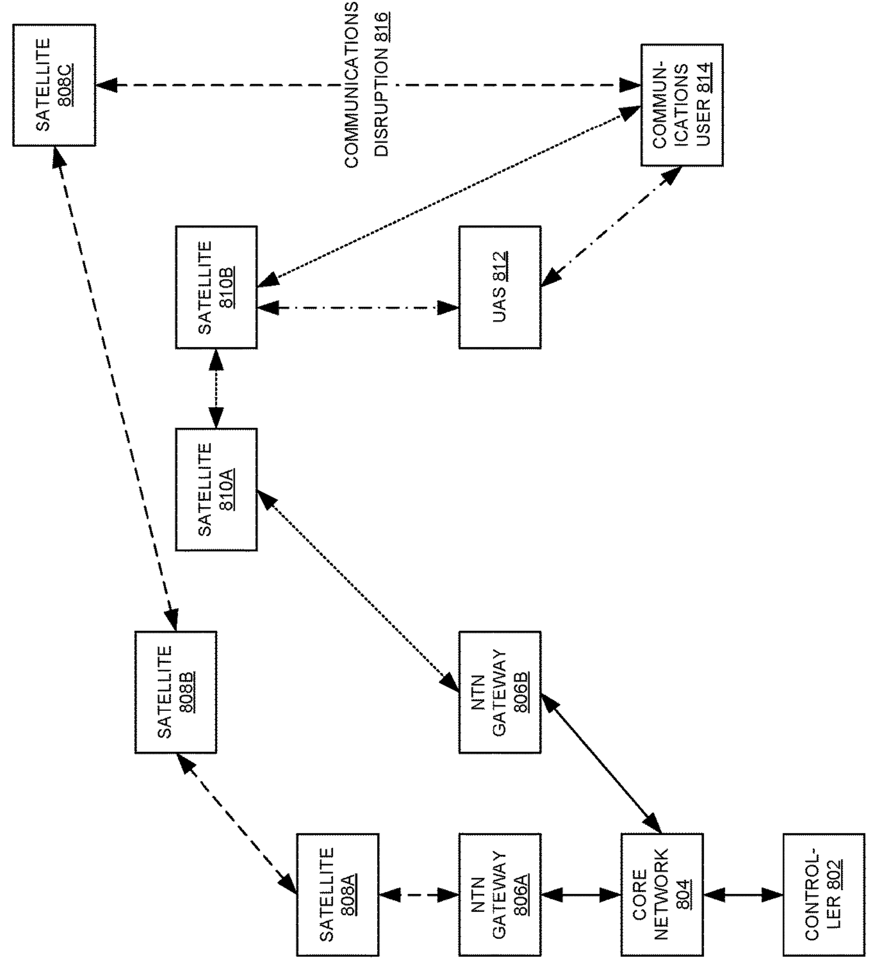
FIG. 8 illustrates an example system architecture of multiple coverage options for a satellite operator, and that can facilitate handoff matching in a 3D network mesh, in accordance with an embodiment of this disclosure.

FIG. 8 illustrates an example system architecture 800 of multiple coverage options for a satellite operator, and that can facilitate handoff matching in a 3D network mesh, in accordance with an embodiment of this disclosure. In some examples, part(s) of FIG. 8 can be used to implement part(s) of system architecture 100 of FIG. 1 handoff matching in a 3D network mesh.

System architecture 800 comprises controller 802 (which can implement part(s) of the present techniques), core network 804, NTN gateway 806A, NTN gateway 806B, satellite 808A, satellite 808B, satellite 808C, satellite 810A, satellite 810B (where satellite 808A, satellite 808B, and satellite 808C can be of one communications type or constellation, and satellite 810A and satellite 810B can be of another communications type or constellation), UAS 812, communications user 814, and communications disruption 816.

Another scenario can involve HA services for satcom communications leveraging a 3D network. The requestor can be satcom operators. The donor can be satcom operators, or a temporarily dispatched unmanned aerial systems (UAS) relay. The customer base can comprise high-speed trains/airplanes/ships, oil, military, and users in remote mountain areas that have no access to cellular tower, so solely rely on satcom and continuous connectivity is critical for their daily operations.

For the satcom operator, it can be that the service interruption is not unusual. Other than a software (SW) glitch, hardware (HW) malfunctions at a satellite or ground station, one of the factors can be severe weather. The attenuation of an electromagnetic wave traveling through atmosphere can increase with frequency. It can be that the effect is not a linear line because multiple factors such as absorption, scattering, and scintillation can contribute to the attenuation. The resulting path loss can depend on weather conditions and the distribution of oxygen, water vapor, turbulence, etc., at different altitudes along an RF path. In some examples, a tropical downpour could cause ~5 dB/km attenuation for RF higher than 10 GHz, while the impact can be negligible (<0.05 dB/km) for RF lower than 1 GHz. Some satcom can have a capability to switch frequencies to do self-back up. Even with that, a satcom can have outages for other reasons, such as because of security certificates expired at a ground station.

For opt-in satcom operators that comply with a 3GPP protocol, a controller can follow 3GPP standards to determine free space path loss, link budget, and typical atmospheric attenuation (e.g., clear, light rain, downpour, etc.) for each operator's frequency and transmitter/receiver power, antenna gain, etc., in a requested HA region (in some examples, a distance between a UE and a satellite can be tuned according to satellite orbit), which can result in a series of curves. Risk zones can be marked on these curves to alert the conditions when an RF signal is too weak to tolerate fluctuation. The pre-determined risk zone can alert satcom operators to temporarily increase RF transmitter power to avoid a potential outage, as it can be that the satellite may not operate in maximum power mode all the time. If the outage is unavoidable at a maximum power mode, this baseline analysis provided by the controller can speed up real-time handoff matching calculation when disruption events happen.

For example, in FIG. 8, a satcom network comprising satellite 808A, satellite 808B, and satellite 808C uses a 28 GHz frequency for service uplink to achieve a higher data speed. When bad weather happens in a region, a local user's (e.g., a ship in ocean) uplink signal can be attenuated so heavily that the receiver on satellite cannot detect it. When this satcom network ground station (NTN gateway 806A) requests HA coverage from a shared service pool, where the determined link budget for another satcom network comprising satellite 810A and satellite 810B (using 1.6 GHz for service uplink) is adequate for continuous operation in the same region, the other satcom (e.g., satellite 810A and satellite 810B) network's available bandwidth can be provided to the impacted ship upon two satcom operators signing a digital contract issued by the controller. Dispatching UAS as a temporary relay through NR Uu air interface can be another option.

Example Process Flows

FIG. 9 illustrates an example process flow 900 that can facilitate handoff matching in a 3D network mesh, in accordance with an embodiment of this disclosure. In some examples, one or more embodiments of process flow 900 can be implemented by handoff matching in a 3D network mesh component 108 of FIG. 1, or computing environment 1200 of FIG. 12.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 600 of FIG. 6, process flow 1000 of FIG. 10, and/or process flow 1100 of FIG. 11.

Process flow 900 begins with 902, and moves to operation 904.

Operation 904 depicts receiving respective information of a group of networks, where the respective information identifies a respective geographical area of network coverage of a respective network of the group of networks, a respective first indication of an amount of bandwidth of the respective network, and a respective second indication of whether the amount of bandwidth is to be requested or donated by the respective network, and where a system that implements process flow 900 is separate from the group of networks. That is, using the example of FIG. 1, this can comprise computer system 102 receiving this information for network 106A and network 106B. The group of networks can comprise a 3D mesh. In some examples, this can be information similar to that described with respect to operation 604 of FIG. 6.

In some examples, the respective information comprises at least one respective identification of at least one cell of the respective network for which a high-availability connection is requested or donated, at least one respective operating frequency of the respective network, a respective measure of latency associated with the respective network, or a quality-of-service metric associated with the respective network. That is, for different networks, information can be stored that can include a coverage map, an operating frequency, protocols, bandwidth, a latency range, QoS, service level (e.g., some cells may opt-out HA service), etc.

After operation 904, process flow 900 moves to operation 906.

Operation 906 depicts determining respective first coverage options for respective networks of the group of networks based on the respective information. In some examples, this can comprise predetermining HA handoff options for disruption scenarios. In some examples, this can be performed in a similar manner as operation 606 of FIG. 6.

After operation 906, process flow 900 moves to operation 908.

Operation 908 depicts, after determining the respective first coverage options, receiving a request from a network of the group of networks for bandwidth from another network of the group of networks. That is, an operator can request HA service from a coverage pool. In some examples, this can be performed in a similar manner as operation 610 of FIG. 6.

In some examples, operation 908 comprises, before receiving the request, updating the first coverage options based on information received subsequent to performing the determining of the respective first coverage options, to produce updated first coverage options, where determining the second coverage options is performed based on the updated first coverage options. That is, information about networks (such as in operation 904) can be updated over time, and can be used to update coverage options.

In some examples, operation 908 comprises sending at least part of the first coverage options to the network before receiving the request. That is, pre-matched baseline options can be shared with requestors and donors, so they can be aware of typical HA coverage options and can pre-plan handoff protocols accordingly to better prepare for service disruption.

In some examples, at least the part of the first coverage options comprises a ranking of coverage options of at least the part of the first coverage options, a proposed service agreement that corresponds to at least the part of the first coverage options, or pricing information that corresponds to at least the part of the first coverage options, where the pricing information varies based on geographic location or a type of service disruption event.

For a requestor, pricing can be proportional to the bandwidth requested. So, it can be that a requestor can request a limited amount of bandwidth (compared to its ground full capacity; and for, e.g., emergency texts and voice calls) to provide an HA service to users who are willing to pay more to subscribe to HA access. If, during a request period, a donor has less bandwidth than originally predicted in baseline, the requestor can still use it and prioritize a connection for tiered subscribers.

In some examples, the request indicates a time period of coverage, and determining the second coverage options is performed based on the time period of coverage. This can be implemented in a similar manner as operation 610 of FIG. 6. In some examples, the request can indicate a time period and a number of those time periods for which coverage can be requested.

After operation 908, process flow 900 moves to operation 910.

Operation 910 depicts, based on the request, determining second coverage options for the network based on the respective first coverage options and based on respective amounts of available bandwidth of the group of networks determined after receiving the request. That is, a real-time determination of coverage options can be made based on baseline options of operation 906 and a dynamic status of donated bandwidth. In some examples, this can be performed in a similar manner as operation 612 of FIG. 6.

After operation 910, process flow 900 moves to operation 912.

Operation 912 depicts facilitating the network utilizing a second coverage option of the second coverage options for network communications. That is, the requestor can select a coverage option and activate users in the HA cell to use this coverage option, and this can be facilitated by—using the example of FIG. 1—computer system 102. In some examples, this can be performed in a similar manner as operations 614-616 of FIG. 6.

In some examples, operation 912 can comprise facilitating the network in selecting a selected coverage option of the second coverage options, and in activating devices of the network to the selected coverage option. This can be implemented in a similar manner as operation 616 of FIG. 6.

After operation 912, process flow 900 moves to 914, where process flow 900 ends.

FIG. 10 illustrates an example process flow 1000 that can facilitate handoff matching in a 3D network mesh, in accordance with an embodiment of this disclosure. In some examples, one or more embodiments of process flow 1000 can be implemented by handoff matching in a 3D network mesh component 108 of FIG. 1, or computing environment 1200 of FIG. 12.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 600 of FIG. 6, process flow 900 of FIG. 9, and/or process flow 1100 of FIG. 11.

Process flow 1000 begins with 1002, and moves to operation 1004.

Operation 1004 depicts receiving respective information of a group of networks, where the respective information identifies a respective geographical area of network coverage of a respective network of the group of networks, a respective first indication of an amount of bandwidth of the respective network, and a respective second indication of whether the amount of bandwidth is to be requested or donated by the respective network, and where a system that implements process flow 1000 is separate from the group of networks. In some examples operation 1004 can be implemented in a similar manner as operation 904 of FIG. 9.

After operation 1004, process flow 1000 moves to operation 1006.

Operation 1006 depicts determining respective first coverage options for respective networks of the group of networks based on the respective information. In some examples operation 1006 can be implemented in a similar manner as operation 906 of FIG. 9.

In some examples, operation 1006 comprises determining respective link budgets, respective path losses (which can be typical path losses), or respective neighbor cell interferences (which can be potential cell interference) of the respective first coverage options. In some examples, determining the respective link budgets, the respective path losses, or the respective neighbor cell interferences of the respective first coverage options is performed for multiple disruption scenarios.

After operation 1006, process flow 1000 moves to operation 1008.

Operation 1008 depicts, after determining the respective first coverage options, receiving a request from a first network of the group of networks for bandwidth from a second network of the group of networks. In some examples operation 1008 can be implemented in a similar manner as operation 908 of FIG. 9.

In some examples, operation 1008 comprises identifying a geographical risk zone for weather conditions that attenuate radio frequency transmissions beyond a threshold criterion specified by a defined curve, and sending an indication of at least part of the geographical risk zone to a second network of the group of networks, where the second network comprises a satellite-based communications network.

That is, risk zones can be marked on pre-determined curves to alert a few types of weather conditions that could attenuate RF signal too much to tolerate fluctuations. Such a pre-determined risk zone can enable satcom operators to temporarily increase RF transmitter power to a avoid potential outage, without having a satellite operate in a maximum power mode all the time. A predetermined curve can calculate an amount of attenuation for different frequencies for different scenarios (e.g., with precipitation, a drizzle, light rain, heavy rain, and tropical downpour).

In some examples, these curves can be determined based on publicly-available weather information for a particular geographical area.

In some examples, the first network is a requestor of bandwidth in a first geographical area, and the first network is a donator of bandwidth in a second geographical area. That is, it can be that an operator is not only a requestor or only a donor. One operator can be a requestor for one geographical area, and a donor for another geographical area. In some examples, an operator can register as both a requestor and a donor at one geographical area. This can be performed based on a capacity surplus history at various geographical locations. Where an operator serves as both a requestor and a donor, and there is a monetary fee associated with being a requestor and a payment associated with being a donor, it can be that the operator has no net fee after balancing requests with donations, while also facilitating HA functionality for their users.

In some examples, the first requestor registers as a requestor of bandwidth, and the first requestor registers as a donator of bandwidth. In some examples, the first network registers as the requestor of bandwidth in a first geographical area, and where the first network registers as the donator of bandwidth in a second geographical area. Where an operator serves as both a requestor and a donor, it can be that these occur at different times.

After operation 1008, process flow 1000 moves to operation 1010.

Operation 1010 depicts, based on the request, determining second coverage options for the first network based on the respective first coverage options and based on respective amounts of available bandwidth of the group of networks determined after receiving the request. In some examples operation 1010 can be implemented in a similar manner as operation 910 of FIG. 9.

After operation 1010, process flow 1000 moves to operation 1012.

Operation 1012 depicts facilitating the first network to utilize a second coverage option of the second coverage options for network communications. In some examples operation 1012 can be implemented in a similar manner as operation 912 of FIG. 9.

In some examples, the request is a first request, and operation 1012 comprises receiving a second request by a second network for bandwidth from the group of networks, where the second network is separate from the group of networks, and where first coverage options omit reference to the second network, and, after receiving the second request, determining third coverage options for the second network. In some examples, this can be implemented in a similar manner as operation 618 of FIG. 6.

After operation 1012, process flow 1000 moves to 1014, where process flow 1000 ends.

FIG. 11 illustrates an example process flow 1100 that can facilitate handoff matching in a 3D network mesh, in accordance with an embodiment of this disclosure. In some examples, one or more embodiments of process flow 1100 can be implemented by handoff matching in a 3D network mesh component 108 of FIG. 1, or computing environment 1200 of FIG. 12.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 600 of FIG. 6, process flow 900 of FIG. 9, and/or process flow 1000 of FIG. 10.

Process flow 1100 begins with 1102, and moves to operation 1104.

Operation 1104 depicts receiving respective information of a group of networks, where the respective information identifies whether bandwidth is to be requested or donated by the respective network, and where a system that implements process flow 1100 is separate from the group of networks. In some examples, operation 1104 can be implemented in a similar manner as operation 904 of FIG. 9.

In some examples, a system that implements process flow 1100 comprises a first system that corresponds to a first geographical area for first network communications, and where the system comprises a second system that corresponds to a second geographical area for second network communications. That is, one or more controllers can be used to service one or more geographical areas.

In some examples, receiving the respective information of the group of networks comprises: receiving respective radio frequency coverage maps, respective communication frequencies for a network cell for which registration to a system that implements process flow 1100 is being performed for at least one neighboring cell of the network cell, respective donated bandwidth per cell at a predefined price range or timeslot, or respective service level agreements that identify a number of channels that are able to be supported simultaneously for the network cell, an uplink or downlink speed range, or a one-way latency.

After operation 1104, process flow 1100 moves to operation 1106.

Operation 1106 depicts determining respective first coverage options for respective networks of the group of networks based on the respective information. In some examples, operation 1106 can be implemented in a similar manner as operation 906 of FIG. 9.

In some examples, operation 1106 is performed based on determining inter-network coverage overlaps of the group of networks, and determining respective neighboring frequencies of the respective networks.

After operation 1106, process flow 1100 moves to operation 1108.

Operation 1108 depicts, after determining the respective first coverage options, receiving a request from a first network of the group of networks for bandwidth from second network of the group of networks. In some examples, operation 1108 can be implemented in a similar manner as operation 908 of FIG. 9.

After operation 1108, process flow 1100 moves to operation 1110.

Operation 1110 depicts, based on the request, determining second coverage options for the first network based on the respective first coverage options and based on respective amounts of available bandwidth of the group of networks determined after receiving the request. In some examples, operation 1110 can be implemented in a similar manner as operation 910 of FIG. 9.

After operation 1110, process flow 1100 moves to operation 1112.

Operation 1112 depicts enabling the first network to utilize a second coverage option of the second coverage options for network communications. In some examples, operation 1112 can be implemented in a similar manner as operation 912 of FIG. 9.

In some examples, operation 1112 comprises enabling the first network to utilize a high availability failover to the second coverage option.

After operation 1112, process flow 1100 moves to 1114, where process flow 1100 ends.

Example Operating Environment

In order to provide additional context for various embodiments described herein, FIG. 12 and the following discussion are intended to provide a brief, general description of a suitable computing environment 1200 in which the various embodiments of the embodiment described herein can be implemented.

For example, parts of computing environment 1200 can be used to implement one or more embodiments of computer system 102, network 106A, and/or network 106B.

In some examples, computing environment 1200 can implement one or more embodiments of the process flows of FIGS. 9-11 to facilitate handoff matching in a 3D network mesh.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a nonvolatile storage such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are examples, and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:

at least one processor; and at least one memory that stores executable instructions that, when executed by the at least one processor, facilitate performance of operations, comprising:

receiving respective information of a group of networks, wherein the respective information identifies a respective geographical area of network coverage of a respective network of the group of networks, a respective first indication of an amount of bandwidth of the respective network, and a respective second indication of whether the amount of bandwidth is to be requested or donated by the respective network, and wherein the system is separate from the group of networks;

determining respective first coverage options for respective networks of the group of networks based on the respective information;

after determining the respective first coverage options, receiving a request from a network of the group of networks for bandwidth from another network of the group of networks;

based on the request, determining second coverage options for the network based on the respective first coverage options and based on respective amounts of available bandwidth of the group of networks determined after receiving the request; and facilitating the network utilizing a second coverage option of the second coverage options for network communications.

2. The system of claim 1, wherein the operations further comprise:

before receiving the request, updating the first coverage options based on information received subsequent to performing the determining of the respective first coverage options, to produce updated first coverage options, wherein determining the second coverage options is performed based on the updated first coverage options.

3. The system of claim 1, wherein the respective information comprises:

at least one respective identification of at least one cell of the respective network for which a high-availability connection is requested or donated, at least one respective operating frequency of the respective network, a respective measure of latency associated with the respective network, or a quality-of-service metric associated with the respective network.

4. The system of claim 1, wherein the operations further comprise:

sending at least part of the first coverage options to the network before receiving the request.

5. The system of claim 4, wherein at least the part of the first coverage options comprises:

a ranking of coverage options of at least the part of the first coverage options, a proposed service agreement that corresponds to at least the part of the first coverage options, or pricing information that corresponds to at least the part of the first coverage options, wherein the pricing information varies based on geographic location or a type of service disruption event.

6. The system of claim 1, wherein the request indicates a time period of coverage, and wherein determining the second coverage options is performed based on the time period of coverage.

7. The system of claim 1, wherein facilitating the network utilizing the second coverage option for network communications comprises:

facilitating the network in selecting a selected coverage option of the second coverage options, and in activating devices of the network to the selected coverage option.

8. A method, comprising:

receiving, by a system comprising at least one processor, respective information of a group of networks, wherein the respective information identifies a respective geographical area of network coverage of a respective network of the group of networks, a respective first indication of an amount of bandwidth of the respective network, and a respective second indication of whether the amount of bandwidth is to be requested or donated by the respective network, and wherein the system is separate from the group of networks;

determining, by the system, respective first coverage options for respective networks of the group of networks based on the respective information;

after determining the respective first coverage options, receiving, by the system, a request from a first network of the group of networks for bandwidth from a second network of the group of networks;

based on the request, determining, by the system, second coverage options for the first network based on the respective first coverage options and based on respective amounts of available bandwidth of the group of networks determined after receiving the request; and facilitating, by the system, the first network to utilize a second coverage option of the second coverage options for network communications.

9. The method of claim 8, wherein the request is a first request, and further comprising:

receiving, by the system, a second request by a second network for bandwidth from the group of networks, wherein the second network is separate from the group of networks, and wherein first coverage options omit reference to the second network; and after receiving the second request, determining third coverage options for the second network.

10. The method of claim 8, wherein determining the respective first coverage options for the respective networks based on the respective information comprises:

determining respective link budgets, respective path losses, or respective neighbor cell interferences of the respective first coverage options.

11. The method of claim 10, wherein determining the respective link budgets, the respective path losses, or the respective neighbor cell interferences of the respective first coverage options is performed for multiple disruption scenarios.

12. The method of claim 8, further comprising:

identifying, by the system, a geographical risk zone for weather conditions that attenuate radio frequency transmissions beyond a threshold criterion specified by a defined curve; and sending, by the system, an indication of at least part of the geographical risk zone to a second network of the group of networks, wherein the second network comprises a satellite-based communications network.

13. The method of claim 8, wherein the first network is a requestor of bandwidth in a first geographical area, and wherein the first network is a donator of bandwidth in a second geographical area.

14. The method of claim 8, wherein the first requestor registers as a requestor of bandwidth, and wherein the first requestor registers as a donator of bandwidth.

15. The method of claim 14, wherein the first network registers as the requestor of bandwidth in a first geographical area, and wherein the first network registers as the donator of bandwidth in a second geographical area.

16. A non-transitory computer-readable medium comprising instructions that, in response to execution, cause a system comprising at least one processor to perform operations, comprising:

receiving respective information of a group of networks, wherein the respective information identifies whether bandwidth is to be requested or donated by the respective network, and wherein the system is separate from the group of networks;

determining respective first coverage options for respective networks of the group of networks based on the respective information;

after determining the respective first coverage options, receiving a request from a first network of the group of networks for bandwidth from second network of the group of networks;

based on the request, determining second coverage options for the first network based on the respective first coverage options and based on respective amounts of available bandwidth of the group of networks determined after receiving the request; and enabling the first network to utilize a second coverage option of the second coverage options for network communications.

17. The non-transitory computer-readable medium of claim 16, wherein receiving the respective information of the group of networks comprises:

receiving respective radio frequency coverage maps, respective communication frequencies for a network cell for which registration to the system is being performed or at least one neighboring cell of the network cell, respective donated bandwidth per cell at a predefined price range or timeslot, or respective service level agreements that identify a number of channels that are able to be supported simultaneously for the network cell, an uplink or downlink speed range, or a one-way latency.

18. The non-transitory computer-readable medium of claim 16, wherein determining the respective first coverage options is performed based on determining inter-network coverage overlaps of the group of networks, and determining respective neighboring frequencies of the respective networks.

19. The non-transitory computer-readable medium of claim 16, wherein the system comprises a first system that corresponds to a first geographical area for first network communications, and wherein the system comprises a second system that corresponds to a second geographical area for second network communications.

20. The non-transitory computer-readable medium of claim 16, wherein enabling the first network to utilize the second coverage option for the network communications comprises:

enabling the first network to utilize a high availability failover to the second coverage option.

* * * * *